United States Patent
Chundrlik, Jr. et al.

(10) Patent No.: US 9,824,587 B2
(45) Date of Patent: *Nov. 21, 2017

(54) VEHICLE VISION SYSTEM WITH COLLISION MITIGATION

(71) Applicant: MAGNA ELECTRONICS INC., Auburn Hills, MI (US)

(72) Inventors: William J. Chundrlik, Jr., Rochester Hills, MI (US); Dominik Raudszus, Aachen (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,666

(22) Filed: Feb. 12, 2016

(65) Prior Publication Data

US 2016/0163199 A1     Jun. 9, 2016

Related U.S. Application Data

(63) Continuation of application No. 14/303,694, filed on Jun. 13, 2014, now Pat. No. 9,260,095.

(60) Provisional application No. 61/836,900, filed on Jun. 19, 2013.

(51) Int. Cl.
| | |
|---|---|
| *G08G 1/16* | (2006.01) |
| *B60T 8/171* | (2006.01) |
| *G06K 9/00* | (2006.01) |
| *B60T 7/22* | (2006.01) |

(52) U.S. Cl.
CPC .............. *G08G 1/166* (2013.01); *B60T 7/22* (2013.01); *B60T 8/171* (2013.01); *G06K 9/00805* (2013.01); *G06K 9/00825* (2013.01); *B60T 2201/024* (2013.01); *B60T 2210/32* (2013.01)

(58) Field of Classification Search
CPC . G08G 1/166; B60T 7/22; B60T 8/171; B60T 2201/024; B60T 2210/32; G06K 9/00805; G06K 9/00825
USPC .................................................... 701/70, 301
See application file for complete search history.

(56) References Cited

U.S. PATENT DOCUMENTS

| | | |
|---|---|---|
| 4,720,790 A | 1/1988 | Miki et al. |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |

(Continued)

*Primary Examiner* — Fadey S. Jabr
*Assistant Examiner* — Angelina M Shudy
(74) *Attorney, Agent, or Firm* — Gardner, Linn, Burkhart & Flory, LLP

(57) ABSTRACT

A method for determining potential collision includes capturing image data of an exterior environment ahead of a subject vehicle via a camera disposed at the subject vehicle. The presence of a leading vehicle ahead of the equipped vehicle is determined via image processing of captured image data. A time to collision to the leading vehicle is determined via image processing of captured image data. A determination, via image processing of captured image data, is made if a brake light of the leading vehicle is illuminated. Based at least in part on the determined time to collision and determination that the brake light of the leading vehicle is illuminated, at least one of (i) a degree of warning to a driver of the subject vehicle is determined and (ii) a braking level of the subject vehicle to mitigate collision with the leading vehicle is determined.

18 Claims, 2 Drawing Sheets

(56) References Cited

U.S. PATENT DOCUMENTS

| | | |
|---|---|---|
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,357,438 A * | 10/1994 | Davidian ............ B60K 37/06 180/169 |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |

(56) References Cited

U.S. PATENT DOCUMENTS

| | | | |
|---|---|---|---|
| 6,020,704 A | 2/2000 | Buschur | |
| 6,049,171 A | 4/2000 | Stam et al. | |
| 6,066,933 A | 5/2000 | Ponziana | |
| 6,084,519 A | 7/2000 | Coulling et al. | |
| 6,097,023 A | 8/2000 | Schofield et al. | |
| 6,097,024 A | 8/2000 | Stam et al. | |
| 6,100,799 A | 8/2000 | Fenk | |
| 6,144,022 A | 11/2000 | Tenenbaum et al. | |
| 6,175,300 B1 | 1/2001 | Kendrick | |
| 6,178,034 B1 | 1/2001 | Allemand et al. | |
| 6,185,499 B1 * | 2/2001 | Kinoshita | B60K 31/0008 180/179 |
| 6,198,409 B1 | 3/2001 | Schofield et al. | |
| 6,201,642 B1 | 3/2001 | Bos et al. | |
| 6,222,447 B1 | 4/2001 | Schofield et al. | |
| 6,223,114 B1 | 4/2001 | Boros et al. | |
| 6,227,689 B1 | 5/2001 | Miller | |
| 6,250,148 B1 | 6/2001 | Lynam | |
| 6,266,082 B1 | 7/2001 | Yonezawa et al. | |
| 6,266,442 B1 | 7/2001 | Laumeyer et al. | |
| 6,285,393 B1 | 9/2001 | Shimoura et al. | |
| 6,294,989 B1 | 9/2001 | Schofield et al. | |
| 6,297,781 B1 | 10/2001 | Turnbull et al. | |
| 6,302,545 B1 | 10/2001 | Schofield et al. | |
| 6,310,611 B1 | 10/2001 | Caldwell | |
| 6,313,454 B1 | 11/2001 | Bos et al. | |
| 6,317,057 B1 | 11/2001 | Lee | |
| 6,320,176 B1 | 11/2001 | Schofield et al. | |
| 6,320,282 B1 | 11/2001 | Caldwell | |
| 6,333,759 B1 | 12/2001 | Mazzilli | |
| 6,341,523 B2 | 1/2002 | Lynam | |
| 6,353,392 B1 | 3/2002 | Schofield et al. | |
| 6,370,329 B1 | 4/2002 | Teuchert | |
| 6,392,315 B1 | 5/2002 | Jones et al. | |
| 6,396,397 B1 | 5/2002 | Bos et al. | |
| 6,411,204 B1 | 6/2002 | Bloomfield et al. | |
| 6,420,975 B1 | 7/2002 | DeLine et al. | |
| 6,424,273 B1 | 7/2002 | Gutta et al. | |
| 6,430,303 B1 | 8/2002 | Naoi et al. | |
| 6,442,465 B2 | 8/2002 | Breed et al. | |
| 6,477,464 B2 | 11/2002 | McCarthy et al. | |
| 6,497,503 B1 | 12/2002 | Dassanayake et al. | |
| 6,498,620 B2 | 12/2002 | Schofield et al. | |
| 6,516,664 B2 | 2/2003 | Lynam | |
| 6,523,964 B2 | 2/2003 | Schofield et al. | |
| 6,534,884 B2 | 3/2003 | Marcus et al. | |
| 6,539,306 B2 | 3/2003 | Turnbull | |
| 6,547,133 B1 | 4/2003 | Devries, Jr. et al. | |
| 6,553,130 B1 | 4/2003 | Lemelson et al. | |
| 6,559,435 B2 | 5/2003 | Schofield et al. | |
| 6,574,033 B1 | 6/2003 | Chui et al. | |
| 6,589,625 B1 | 7/2003 | Kothari et al. | |
| 6,594,583 B2 | 7/2003 | Ogura et al. | |
| 6,611,202 B2 | 8/2003 | Schofield et al. | |
| 6,611,610 B1 | 8/2003 | Stam et al. | |
| 6,636,258 B2 | 10/2003 | Strumolo | |
| 6,650,455 B2 | 11/2003 | Miles | |
| 6,672,731 B2 | 1/2004 | Schnell et al. | |
| 6,674,562 B1 | 1/2004 | Miles | |
| 6,678,614 B2 | 1/2004 | McCarthy et al. | |
| 6,680,792 B2 | 1/2004 | Miles | |
| 6,684,143 B2 * | 1/2004 | Graf | F16H 61/0213 180/337 |
| 6,690,268 B2 | 2/2004 | Schofield et al. | |
| 6,700,605 B1 | 3/2004 | Toyoda et al. | |
| 6,704,621 B1 | 3/2004 | Stein et al. | |
| 6,710,908 B2 | 3/2004 | Miles et al. | |
| 6,711,474 B1 | 3/2004 | Treyz et al. | |
| 6,714,331 B2 | 3/2004 | Lewis et al. | |
| 6,717,610 B1 | 4/2004 | Bos et al. | |
| 6,735,506 B2 | 5/2004 | Breed et al. | |
| 6,741,377 B2 | 5/2004 | Miles | |
| 6,744,353 B2 | 6/2004 | Sjönell | |
| 6,757,109 B2 | 6/2004 | Bos | |
| 6,762,867 B2 | 7/2004 | Lippert et al. | |
| 6,794,119 B2 | 9/2004 | Miles | |
| 6,795,221 B1 | 9/2004 | Urey | |
| 6,802,617 B2 | 10/2004 | Schofield et al. | |
| 6,806,452 B2 | 10/2004 | Bos et al. | |
| 6,819,231 B2 | 11/2004 | Berberich et al. | |
| 6,822,563 B2 | 11/2004 | Bos et al. | |
| 6,823,241 B2 | 11/2004 | Shirato et al. | |
| 6,824,281 B2 | 11/2004 | Schofield et al. | |
| 6,831,261 B2 | 12/2004 | Schofield et al. | |
| 6,850,156 B2 | 2/2005 | Bloomfield et al. | |
| 6,882,287 B2 | 4/2005 | Schofield | |
| 6,889,161 B2 | 5/2005 | Winner et al. | |
| 6,891,563 B2 * | 5/2005 | Schofield | B60R 1/00 348/143 |
| 6,909,753 B2 | 6/2005 | Meehan et al. | |
| 6,946,978 B2 | 9/2005 | Schofield | |
| 6,953,253 B2 | 10/2005 | Schofield et al. | |
| 6,968,736 B2 | 11/2005 | Lynam | |
| 6,975,775 B2 | 12/2005 | Rykowski et al. | |
| 6,989,736 B2 | 1/2006 | Berberich et al. | |
| 7,004,606 B2 | 2/2006 | Schofield | |
| 7,005,974 B2 | 2/2006 | McMahon et al. | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,079,017 B2 | 7/2006 | Lang et al. | |
| 7,085,637 B2 | 8/2006 | Breed et al. | |
| 7,092,548 B2 | 8/2006 | Laumeyer et al. | |
| 7,111,968 B2 | 9/2006 | Bauer et al. | |
| 7,116,246 B2 | 10/2006 | Winter et al. | |
| 7,123,168 B2 | 10/2006 | Schofield | |
| 7,136,753 B2 | 11/2006 | Samukawa | |
| 7,145,519 B2 | 12/2006 | Takahashi et al. | |
| 7,149,613 B2 | 12/2006 | Stam et al. | |
| 7,161,616 B1 | 1/2007 | Okamoto et al. | |
| 7,167,796 B2 | 1/2007 | Taylor et al. | |
| 7,195,381 B2 | 3/2007 | Lynam et al. | |
| 7,202,776 B2 | 4/2007 | Breed | |
| 7,205,904 B2 | 4/2007 | Schofield | |
| 7,227,459 B2 | 6/2007 | Bos et al. | |
| 7,227,611 B2 | 6/2007 | Hull et al. | |
| 7,301,478 B1 * | 11/2007 | Chinn | B60Q 1/46 340/435 |
| 7,311,406 B2 | 12/2007 | Schofield et al. | |
| 7,325,934 B2 | 2/2008 | Schofield et al. | |
| 7,325,935 B2 | 2/2008 | Schofield et al. | |
| 7,338,177 B2 | 3/2008 | Lynam | |
| 7,339,149 B1 | 3/2008 | Schofield et al. | |
| 7,344,261 B2 | 3/2008 | Schofield et al. | |
| 7,355,524 B2 | 4/2008 | Schofield | |
| 7,365,769 B1 * | 4/2008 | Mager | B60Q 1/44 340/467 |
| 7,370,983 B2 | 5/2008 | De Wind et al. | |
| 7,380,948 B2 | 6/2008 | Schofield et al. | |
| 7,388,182 B2 | 6/2008 | Schofield et al. | |
| 7,402,786 B2 | 7/2008 | Schofield et al. | |
| 7,423,248 B2 | 9/2008 | Schofield et al. | |
| 7,425,076 B2 | 9/2008 | Schofield et al. | |
| 7,446,650 B2 | 11/2008 | Schofield et al. | |
| 7,459,664 B2 | 12/2008 | Schofield et al. | |
| 7,460,951 B2 | 12/2008 | Altan | |
| 7,480,149 B2 | 1/2009 | DeWard et al. | |
| 7,490,007 B2 | 2/2009 | Taylor et al. | |
| 7,492,281 B2 | 2/2009 | Lynam et al. | |
| 7,526,103 B2 | 4/2009 | Schofield et al. | |
| 7,561,181 B2 | 7/2009 | Schofield et al. | |
| 7,581,859 B2 | 9/2009 | Lynam | |
| 7,592,928 B2 * | 9/2009 | Chinomi | B60R 1/00 340/436 |
| 7,616,781 B2 | 11/2009 | Schofield et al. | |
| 7,619,508 B2 | 11/2009 | Lynam et al. | |
| 7,639,149 B2 | 12/2009 | Katoh | |
| 7,681,960 B2 | 3/2010 | Wanke et al. | |
| 7,720,580 B2 * | 5/2010 | Higgins-Luthman | B60R 1/00 250/208.1 |
| 7,724,962 B2 | 5/2010 | Zhu et al. | |
| 7,777,611 B2 | 8/2010 | Desai | |
| 7,855,755 B2 | 12/2010 | Weller et al. | |
| 7,859,565 B2 | 12/2010 | Schofield et al. | |

(56) References Cited

U.S. PATENT DOCUMENTS

| | | | |
|---|---|---|---|
| 7,881,496 B2 | 2/2011 | Camilleri et al. | |
| 7,914,187 B2 | 3/2011 | Higgins-Luthman et al. | |
| 7,952,490 B2* | 5/2011 | Fechner | G08G 1/163 340/901 |
| 7,965,336 B2 | 6/2011 | Bingle et al. | |
| 8,013,780 B2 | 9/2011 | Lynam et al. | |
| 8,027,029 B2 | 9/2011 | Lu et al. | |
| 8,031,062 B2* | 10/2011 | Smith | G08G 1/0962 340/438 |
| 8,058,977 B2* | 11/2011 | Lynam | B60R 1/1207 340/425.5 |
| 8,078,356 B2* | 12/2011 | Kano | B60R 1/00 382/104 |
| 8,144,002 B2* | 3/2012 | Kiuchi | G08G 1/166 340/435 |
| 8,340,866 B2 | 12/2012 | Hanzawa et al. | |
| 8,473,171 B2 | 6/2013 | Zagorski | |
| 8,588,997 B2* | 11/2013 | Pribula | B60Q 1/44 180/244 |
| 8,637,801 B2* | 1/2014 | Schofield | G05D 1/0244 250/208.1 |
| 8,694,224 B2 | 4/2014 | Chundrlik, Jr. et al. | |
| 8,849,495 B2 | 9/2014 | Chundrlik, Jr. et al. | |
| 8,855,844 B2* | 10/2014 | Schwindt | B60K 31/0008 701/22 |
| 9,042,600 B2* | 5/2015 | Endo | G06K 9/00798 340/435 |
| 9,092,986 B2* | 7/2015 | Salomonsson | G08G 1/167 |
| 9,260,095 B2* | 2/2016 | Chundrlik, Jr. | B60T 8/171 |
| 9,264,673 B2* | 2/2016 | Chundrlik, Jr. | H04N 7/181 |
| 9,317,757 B2* | 4/2016 | Winter | G06K 9/00825 |
| 9,318,020 B2* | 4/2016 | Salomonsson | G08G 1/096725 |
| 9,327,693 B2* | 5/2016 | Wolf | B60T 8/17 |
| 9,436,880 B2* | 9/2016 | Bos | B60N 2/002 |
| 9,509,957 B2* | 11/2016 | Higgins-Luthman | B60Q 1/1423 |
| 9,545,921 B2* | 1/2017 | Wolf | B60T 8/17 |
| 9,563,809 B2* | 2/2017 | Salomonsson | G08G 1/167 |
| 9,643,605 B2* | 5/2017 | Pawlicki | B60T 7/22 |
| 9,666,067 B1* | 5/2017 | Nagpal | G08G 1/056 |
| 9,769,381 B2* | 9/2017 | Lu | H04N 5/23238 |
| 2002/0015153 A1 | 2/2002 | Downs | |
| 2002/0044065 A1 | 4/2002 | Quist et al. | |
| 2002/0113873 A1 | 8/2002 | Williams | |
| 2002/0115423 A1* | 8/2002 | Hatae | G08B 13/19645 455/404.1 |
| 2002/0159270 A1 | 10/2002 | Lynam et al. | |
| 2003/0137586 A1 | 7/2003 | Lewellen | |
| 2003/0222982 A1 | 12/2003 | Hamdan et al. | |
| 2003/0227777 A1 | 12/2003 | Schofield | |
| 2004/0012488 A1 | 1/2004 | Schofield | |
| 2004/0016870 A1 | 1/2004 | Pawlicki et al. | |
| 2004/0032321 A1 | 2/2004 | McMahon et al. | |
| 2004/0051634 A1 | 3/2004 | Schofield et al. | |
| 2004/0114381 A1 | 6/2004 | Salmeen et al. | |
| 2004/0128065 A1 | 7/2004 | Taylor et al. | |
| 2004/0200948 A1 | 10/2004 | Bos et al. | |
| 2005/0078389 A1 | 4/2005 | Kulas et al. | |
| 2005/0134966 A1 | 6/2005 | Burgner | |
| 2005/0134983 A1 | 6/2005 | Lynam | |
| 2005/0146792 A1 | 7/2005 | Schofield et al. | |
| 2005/0169003 A1 | 8/2005 | Lindahl et al. | |
| 2005/0195488 A1 | 9/2005 | McCabe et al. | |
| 2005/0200700 A1 | 9/2005 | Schofield et al. | |
| 2005/0232469 A1* | 10/2005 | Schofield | G06K 9/00818 382/104 |
| 2005/0264891 A1 | 12/2005 | Uken et al. | |
| 2006/0018511 A1* | 1/2006 | Stam | B60Q 1/085 382/104 |
| 2006/0018512 A1 | 1/2006 | Stam et al. | |
| 2006/0028731 A1 | 2/2006 | Schofield et al. | |
| 2006/0050018 A1 | 3/2006 | Hutzel et al. | |
| 2006/0061008 A1 | 3/2006 | Karner et al. | |
| 2006/0091813 A1 | 5/2006 | Stam et al. | |
| 2006/0103727 A1 | 5/2006 | Tseng | |
| 2006/0155469 A1* | 7/2006 | Kawasaki | B60R 21/013 701/301 |
| 2006/0164221 A1 | 7/2006 | Jensen | |
| 2006/0164230 A1 | 7/2006 | DeWind et al. | |
| 2006/0250501 A1 | 11/2006 | Wildmann et al. | |
| 2006/0290479 A1* | 12/2006 | Akatsuka | B60Q 9/008 340/425.5 |
| 2007/0023613 A1 | 2/2007 | Schofield et al. | |
| 2007/0104476 A1 | 5/2007 | Yasutomi et al. | |
| 2007/0109406 A1 | 5/2007 | Schofield et al. | |
| 2007/0109651 A1 | 5/2007 | Schofield et al. | |
| 2007/0109652 A1 | 5/2007 | Schofield et al. | |
| 2007/0109653 A1 | 5/2007 | Schofield et al. | |
| 2007/0109654 A1 | 5/2007 | Schofield et al. | |
| 2007/0120657 A1 | 5/2007 | Schofield et al. | |
| 2007/0152803 A1* | 7/2007 | Huang | B60Q 1/525 340/435 |
| 2007/0176080 A1 | 8/2007 | Schofield et al. | |
| 2008/0180529 A1 | 7/2008 | Taylor et al. | |
| 2008/0189000 A1* | 8/2008 | Duong | B60T 7/22 701/20 |
| 2009/0093938 A1* | 4/2009 | Isaji | B60W 10/184 701/96 |
| 2009/0113509 A1 | 4/2009 | Tseng et al. | |
| 2009/0143986 A1* | 6/2009 | Stein | G08G 1/16 701/301 |
| 2009/0174573 A1* | 7/2009 | Smith | G08G 1/0962 340/905 |
| 2009/0177347 A1 | 7/2009 | Breuer et al. | |
| 2009/0243824 A1 | 10/2009 | Peterson et al. | |
| 2009/0244361 A1 | 10/2009 | Gebauer et al. | |
| 2009/0265069 A1 | 10/2009 | Desbrunes | |
| 2009/0295181 A1 | 12/2009 | Lawlor et al. | |
| 2010/0020170 A1* | 1/2010 | Higgins-Luthman | B60Q 1/1423 348/135 |
| 2010/0045797 A1 | 2/2010 | Schofield et al. | |
| 2010/0090863 A1* | 4/2010 | Chen | G01S 13/931 340/901 |
| 2010/0097469 A1 | 4/2010 | Blank et al. | |
| 2010/0228437 A1 | 9/2010 | Hanzawa et al. | |
| 2012/0044066 A1* | 2/2012 | Mauderer | B60T 7/22 340/479 |
| 2012/0062743 A1 | 3/2012 | Lynam et al. | |
| 2012/0218412 A1* | 8/2012 | Dellantoni | G01C 21/3602 348/148 |
| 2012/0245817 A1 | 9/2012 | Cooprider et al. | |
| 2012/0262340 A1 | 10/2012 | Hassan et al. | |
| 2012/0287276 A1* | 11/2012 | Dwivedi | G06K 9/00825 348/148 |
| 2012/0303222 A1 | 11/2012 | Cooprider et al. | |
| 2013/0124052 A1 | 5/2013 | Hahne | |
| 2013/0129150 A1* | 5/2013 | Saito | G06K 9/46 382/104 |
| 2013/0131918 A1 | 5/2013 | Hahne | |
| 2013/0166150 A1* | 6/2013 | Han | B60W 10/18 701/42 |
| 2013/0190972 A1* | 7/2013 | Pribula | B60Q 1/38 701/36 |
| 2013/0231825 A1 | 9/2013 | Chundrlik, Jr. | |
| 2013/0279491 A1* | 10/2013 | Rubin | G08G 1/166 370/347 |
| 2014/0067206 A1* | 3/2014 | Pflug | B60W 10/04 701/41 |
| 2014/0093132 A1* | 4/2014 | Stein | G08G 1/16 382/104 |
| 2014/0156157 A1* | 6/2014 | Johnson | B60T 7/22 701/70 |
| 2014/0195120 A1* | 7/2014 | McClain | G08G 1/16 701/41 |
| 2014/0222280 A1* | 8/2014 | Salomonsson | G08G 1/167 701/28 |
| 2014/0309884 A1 | 10/2014 | Wolf | |
| 2014/0313339 A1* | 10/2014 | Diessner | H04N 7/18 348/148 |
| 2015/0085119 A1* | 3/2015 | Dagan | G06L 7/2033 348/148 |

(56) References Cited

U.S. PATENT DOCUMENTS

| | | | |
|---|---|---|---|
| 2016/0016560 A1* | 1/2016 | Parker | B60W 30/09 |
| | | | 701/70 |
| 2016/0110620 A1* | 4/2016 | Botusescu | G06K 9/00825 |
| | | | 348/148 |
| 2016/0318490 A1* | 11/2016 | Ben Shalom | B60T 7/12 |
| 2016/0375827 A1* | 12/2016 | Bonhoure | B60R 1/00 |
| | | | 340/937 |
| 2017/0108863 A1* | 4/2017 | Chundrlik, Jr. | G05D 1/0246 |
| 2017/0243071 A1* | 8/2017 | Stein | G06K 9/00805 |
| 2017/0259815 A1* | 9/2017 | Shaker | B60W 30/09 |
| 2017/0262712 A1* | 9/2017 | Chundrlik, Jr. | G06K 9/00798 |

* cited by examiner

VEHICLE VISION SYSTEM WITH COLLISION MITIGATION

CROSS REFERENCE TO RELATED APPLICATIONS

The present application is a continuation of U.S. patent application Ser. No. 14/303,694, filed Jun. 13, 2014, now U.S. Pat. No. 9,260,095, which claims the filing benefits of U.S. provisional application Ser. No. 61/836,900, filed Jun. 19, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system and/or collision warning system or vision system or imaging system for a vehicle that utilizes one or more cameras (such as one or more CMOS cameras) to capture image data representative of images exterior of the vehicle, and determines an appropriate warning or alert and/or an appropriate or required braking level or condition for the vehicle to avoid or mitigate a collision with a leading vehicle in the path of travel ahead of the equipped vehicle. The vision system determines an appropriate warning or alert level or timing and/or an appropriate braking level and, responsive to a determination of whether or not the taillight or taillights or brake lights of the leading vehicle are actuated, the vision system may adjust or weight one or more parameters to increase the valuation or emphasis on that parameter or parameters when the vision system determines that the leading vehicle is braking.

For example, the vision system may determine a relative acceleration between the equipped vehicle and the leading vehicle and, responsive to a determination that the leading vehicle is braking (such as via a determination that the brake lights of the leading vehicle are actuated), the system may increase the emphasis or weight of the relative acceleration in the determination or calculation, in order to provide an earlier warning (or louder or more intense warning) and/or to increase the braking level that is appropriate or required to avoid or mitigate the collision. Similarly, responsive to a determination that the leading vehicle is not braking (such as via a determination that the brake lights of the leading vehicle are not actuated), the system may decrease the emphasis or weight of the relative acceleration in the determination or calculation, in order to provide a later warning or alert (or softer or less intense warning) and/or decrease the braking level that is appropriate or required to avoid or mitigate the collision.

Therefore, the system of the present invention determines and utilizes the preceding or leading vehicle brake light illumination to independently determine that the leading or preceding vehicle is decelerating. This knowledge or determination can be used to apply weighting to the determined relative acceleration value to increase the emphasis of the data. The weighted acceleration data is used when calculating the time to collision and required vehicle deceleration to avoid or mitigate potential collision with the leading vehicle, and/or may be used to determine the timing of an alert or warning and the degree of that alert or warning.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
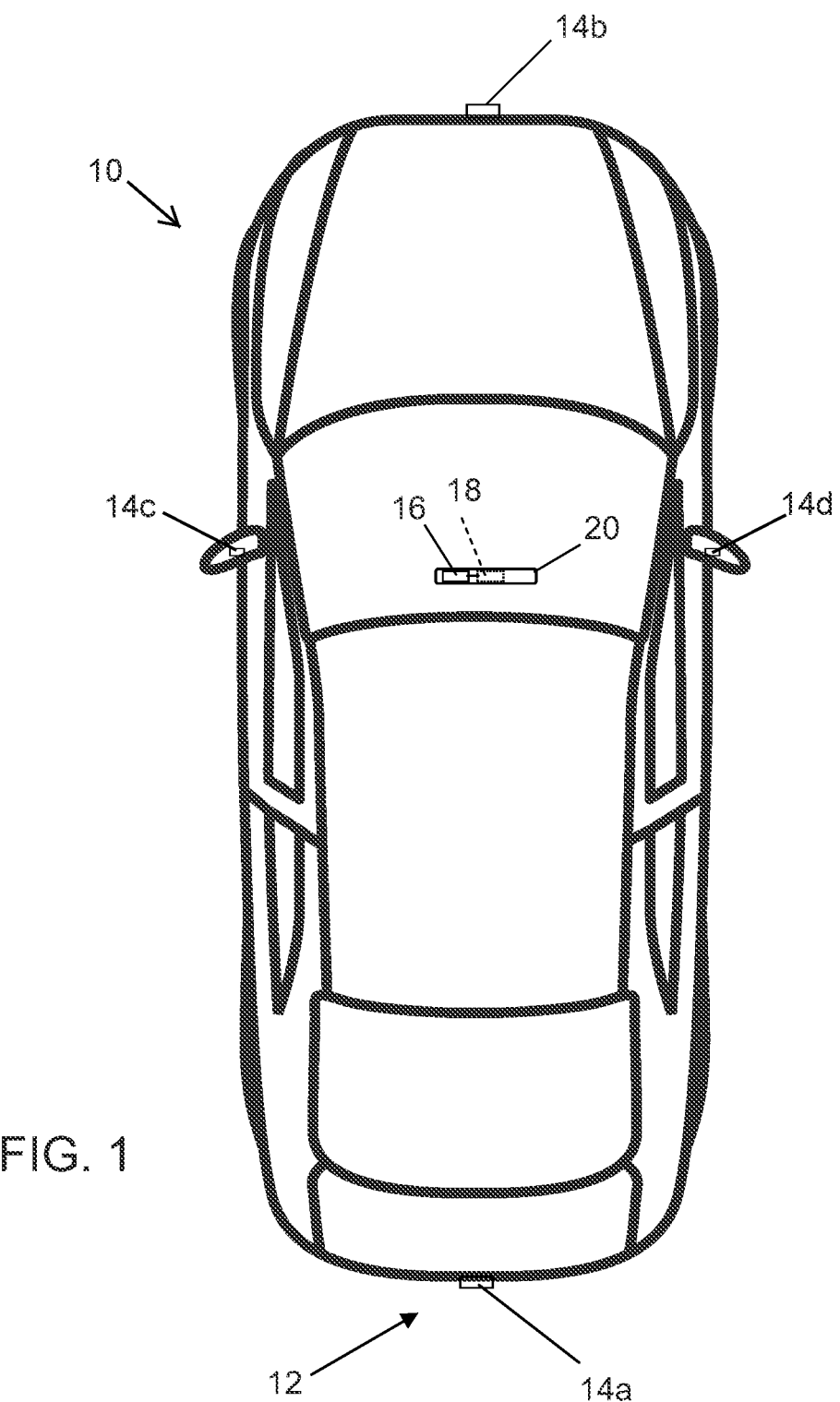
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Collision avoidance systems and collision mitigation systems typically require information about the location and motion of preceding vehicles (vehicles ahead of the subject or equipped vehicle). Calculating if a collision may occur is based on data associated with the subject vehicle and the preceding vehicle. This data is used to determine if a collision will occur, the estimated or calculated time to the collision and the magnitude of the subject vehicle braking needed to avoid the collision. When the time to collision is below a predefined value or threshold level, vehicle avoidance/mitigation functions utilizing automatic braking are activated. The time to collision determination requires accurate distance, relative velocity and acceleration between the subject vehicle and the leading or preceding vehicle.

Object detection sensors that determine the distance and velocity are typically accurate enough. The determination of acceleration is susceptible to error which can cause incorrect determination of the time to collision. For example, an error in the determination or estimation of the preceding vehicle acceleration could trigger a collision mitigation system to mistakenly determine that the vehicle is going to collide with another vehicle. Also, this acceleration error may generate an incorrect magnitude of emergency braking to avoid the collision. Such braking could be dangerous if following vehicles are close behind the subject (braking) vehicle and emergency braking is not warranted. Perhaps worse, the system may mistakenly determine that the vehicle is not about to be in a collision and the system does not take action to prevent an otherwise avoidable collision.

The present invention provides an enhanced system that incorporates a relative acceleration weighting factor to reduce errors associated with the calculations of collision avoidance/mitigation/warning variables. The preceding vehicle acceleration calculated by the object detection sensors is inherently noisy or latent due to the method acceleration is determined. Acceleration is typically determined utilizing either a first/second derivative of radar/lidar sensor data or image inflation of object data. To reduce performance impacts associated with noisy acceleration data, various filtering techniques may be applied. Typically, filtering makes the acceleration data latent, thereby potentially reducing the performance and effectiveness of the collision avoidance/mitigation feature. Also, it may complicate the time relationship between the filtered vs. non-filtered variables used to determine if avoidance/mitigation actions are required.

The system of the present invention utilizes the preceding vehicle brake light illumination to independently determine that the leading or preceding vehicle is decelerating. This knowledge or determination can be used to apply weighting to the sensor determined acceleration to increase the emphasis of the data. For example, if the system determines that the preceding vehicle (the vehicle that is ahead of the equipped or subject vehicle and in the same lane of travel as the equipped or subject vehicle and thus is in the path of travel of the equipped or subject vehicle) brake lights are not illuminated, the system may apply a weighting that decreases the emphasis on the acceleration data. The weighted acceleration data is used when calculating time to collision and required vehicle deceleration to avoid the collision.

In a preferred embodiment, the system may apply weighting of the preceding vehicle acceleration data based on detecting the preceding vehicle brake light illumination. Other techniques other than weighting can be utilized, such as, for example, a discrete low pass filter (proportion of new versus old acceleration) may be used in determining the magnitude of acceleration. The illumination of the preceding vehicle brake lights provides a higher level of confidence that the preceding vehicle is decelerating and is not associated with the sensor data noise. This information is used in an algorithm to apply a larger magnitude of sensor determined acceleration, when determining when to provide a warning and/or initiate an avoidance/mitigation action and determine the amount of deceleration to command. The avoidance/mitigation action and/or timing of a warning or alert (such as an audible or visual or haptic warning or alert) is based on the magnitude of the Time to Collision (TTC) and SV required deceleration, see calculations below.

$$\text{Time to Collision} = \frac{2 * d_x}{d_v \pm \sqrt{d_v(t_0)^2 + 2d_x K_{accelweight} d_a(t_0)}}$$

$$SV \text{ Required } Decel = \frac{sgn(v) * V_{rel}^2}{2(K_{vehgap\ stopped} + V_{rel} t_{brakereaction})} + K_{accelweight}(a_{SV} + a_{rel})$$

Figure 2:
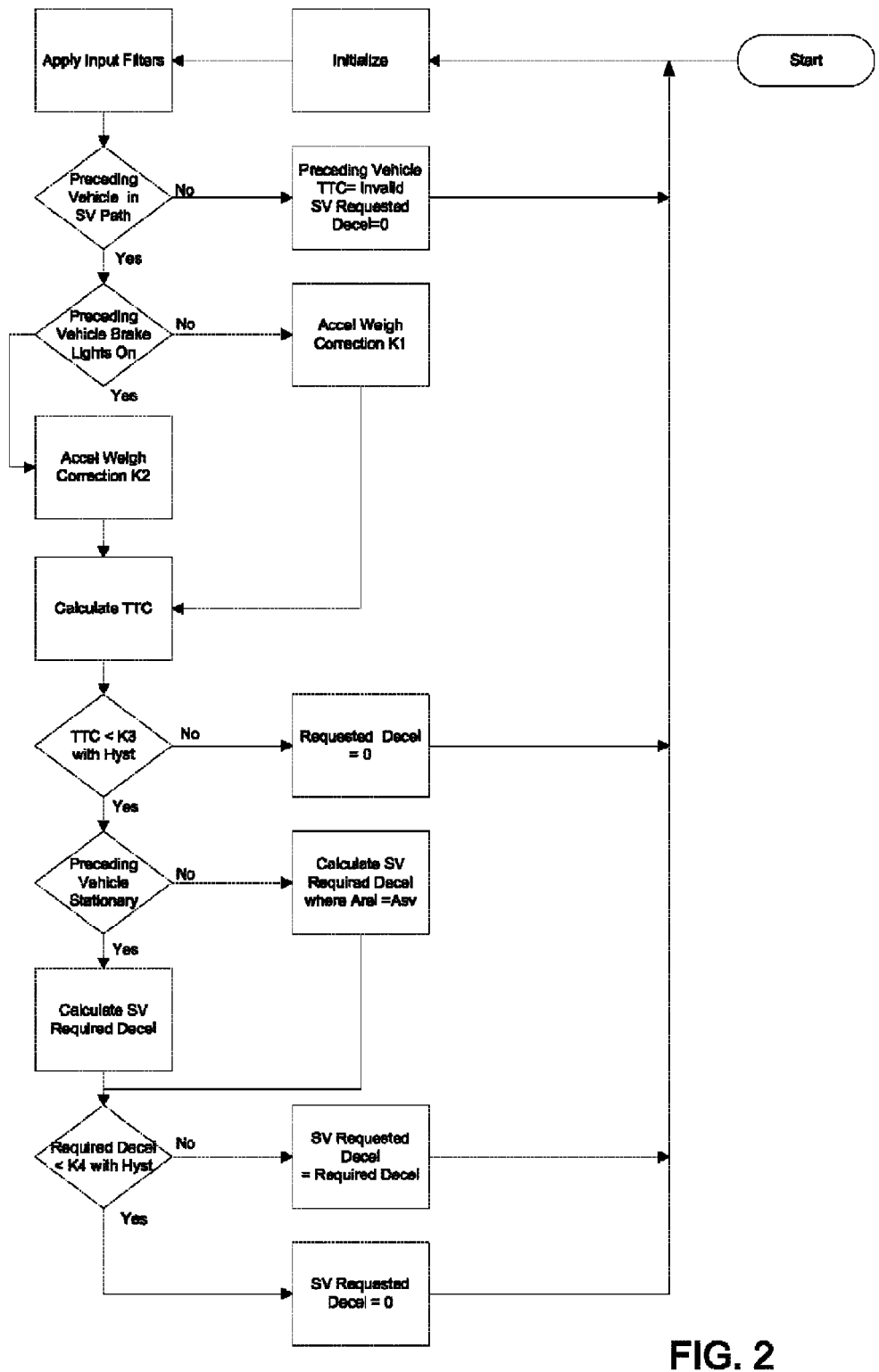
FIG. 2 is a flow chart of a process of determining the time to collision and required vehicle deceleration of the subject vehicle in accordance with the present invention.

In this particular embodiment, the system of the present invention is directed in a method to determine the weighting of sensor determined acceleration, which is utilized in determining collision avoidance/mitigation variables, time to collision and required vehicle deceleration (see FIG. 2). This method comprises:

Capturing the images of the environment preceding the vehicle;

Determining if there is a preceding vehicle and, if there is a preceding vehicle ahead of the subject vehicle, determining if the brake lights of the preceding vehicle are illuminated based on the captured images;

Determining or adjusting the acceleration weighting based on the determined illumination of the preceding vehicle brake lights;

Obtaining the measurement of distance, velocity and acceleration to the preceding vehicle based on the captured images;

Determining the subject vehicle velocity and acceleration utilizing on board sensors;

Determining the relative velocity and acceleration to the preceding vehicle; and Determining the time to collision and required vehicle deceleration (and/or the degree of warning or timing of warning to the driver of the subject vehicle to alert the driver of the hazardous condition and the degree of the hazard) based on distance to, relative velocity and weighted acceleration between the subject and preceding vehicles.

Thus, the present invention provides a calculation or determination of the time to collision with a preceding vehicle and the required or appropriate deceleration of the subject vehicle that may avoid the collision with the preceding vehicle. The system makes the determination or determinations of the relative velocity and relative acceleration between the subject vehicle and the preceding vehicle, and the relative velocity and relative acceleration may be determined or adjusted based on the brake lights of the preceding vehicle, the distance to the preceding vehicle, the preceding vehicle velocity and acceleration (based on image processing of captured image data as captured by a forward facing camera of the subject vehicle), and the subject vehicle velocity and acceleration (based on vehicle sensors or accessories). Responsive to such determinations, an alert may be generated to the driver of the vehicle to alert the driver of a potential or imminent collision, and/or the brake system of the subject vehicle may be controlled to slow or stop the subject vehicle to avoid or mitigate the collision with the preceding vehicle.

Thus, the system or control of the present invention provides enhanced control and adjustment of the vehicle brake system following the initial determination that the brakes should be applied to mitigate collision (such as when the system determines that a collision with a detected target vehicle is likely or imminent). The system of the present invention preferably includes a forward facing (and/or rearward facing) machine vision camera and a forward facing (and/or rearward facing) radar device or sensor (preferably such as described in U.S. Pat. No. 8,013,780, which is hereby incorporated herein by reference in its entirety). As described in U.S. Pat. No. 8,013,780, image data captured by the camera and as processed by an image processor may be fused with radar data for the overall processing and in making the determination of whether to apply the vehicle brakes and/or how much to apply the vehicle brakes.

The system uses a forward facing camera or sensor, which may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640x480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/359,341, filed May 20, 2014 and published Nov. 20, 2014 as U.S. Publication No. 2014/0340510; Ser. No. 14/359,340, filed May 20, 2014 and published Oct. 23, 2014 as U.S. Publication No. 2014/0313339; Ser. No. 14/282,029, filed May 20, 02014, now U.S. Pat. No. 9,205,776; Ser. No. 14/282,028, filed May 20, 2014 and published Nov. 27, 2014 as U.S. Publication No. 2014/0347486; Ser. No. 14/358,232, filed May 15, 2014 and published Oct. 30, 2014 as U.S. Publication No. 2014/0320658; Ser. No. 14/272,834, filed May 8, 2014 and published Nov. 13, 2014 as U.S. Publication No. 2014/0336876; Ser. No. 14/356,330, filed May 5, 2014 and published Oct. 16, 2014 as U.S. Publication No. 2014/0307095; Ser. No. 14/269,788, filed May 5, 2014 and published Nov. 6, 2014 as U.S. Publication No. 2014/0327774; Ser. No. 14/268,169, filed May 2, 2014 and published Nov. 6, 2014 as U.S. Publication No. 2014/0327772; Ser. No. 14/264,443, filed Apr. 29, 2014 and published Oct. 30, 2014 as U.S. Publication No. 2014/0320636; Ser. No. 14/354,675, filed Apr. 28, 2014 and published Oct. 2, 2014 as U.S. Publication No. 2014/0293057; Ser. No. 14/248,602, filed Apr. 9, 2014 and published Oct. 16, 2014 as U.S. Publication No. 2014/0309884; Ser. No. 14/242,038, filed Apr. 1, 2014 and published Aug. 14, 2014 as U.S. Publication No. 2014/0226012; Ser. No. 14/229,061, filed Mar. 28, 2014 and published 2014/0293042 as U.S. Publication No. Oct. 2, 2014; Ser. No. 14/343,937, filed Mar. 10, 2014 and published Aug. 7, 2014 as U.S. Publication No. 2014/0218535; Ser. No. 14/343,936, filed Mar. 10, 2014 and published Aug. 7, 2014 as U.S. Publication No. 2014/0218535; Ser. No. 14/195,135, filed Mar. 3, 2014 and published Sep. 4, 2014 as U.S. Publication No. 2014/0247354; Ser. No. 14/195,136, filed Mar. 3, 2014 and published Sep. 4, 2014 as U.S. Publication No. 2014/0247355; Ser. No. 14/191,512, filed Feb. 27, 2014 and published Sep. 4, 2014 as U.S. Publication No. 2014/0247352; Ser. No. 14/183,613, filed Feb. 19, 2014 and published Aug. 21, 2014 as U.S. Publication No. 2014/0232869; Ser. No. 14/169,329, filed Jan. 31, 2014 and published Aug. 7, 2014 as/U.S. Publication No. 2014/0218529; Ser. No. 14/169,328, filed Jan. 31, 2014, now U.S.

Pat. No. 9,092,986; Ser. No. 14/163,325, filed Jan. 24, 2014 and published Jul. 31, 2014 as U.S. Publication No. 2014/0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013 and published Jun. 12, 2014 as U.S. Publication No. 2014/0160276; Ser. No. 14/102,980, filed Dec. 11, 2013 and published Jun. 19, 2014 as U.S. Publication No. 2014/0168437; Ser. No. 14/098,817, filed Dec. 6, 2013 and published Jun. 19, 2014 as U.S. Publication No. 2014/0168415; Ser. No. 14/097,581, filed Dec. 5, 2013 and published Jun. 12, 2014 as U.S. Publication No. 2014/0160291; Ser. No. 14/093,981, filed Dec. 2, 2013, now U.S. Pat. No. 8,917,169; Ser. No. 14/093,980, filed Dec. 2, 2013 and published Jun. 5, 2014 as U.S. Publication No. 2014/0152825; Ser. No. 14/082,573, filed Nov. 18, 2013 and published May 22, 2014 as U.S. Publication No. 2014/0139676; Ser. No. 14/082,574, filed Nov. 18, 2013 and published May 22, 2014 as U.S. Publication No. 2014/0138140; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013 and published Apr. 17, 2014 as U.S. Publication No. 2014/0104426; Ser. No. 14/046,174, filed Oct. 4, 2013 and published Apr. 10, 2014 as U.S. Publication No. 2014/0098229; Ser. No. 14/036,723, filed Sep. 25, 2013 and published Mar. 27, 2014 as U.S. Publication No. 2014/0085472; Ser. No. 14/016,790, filed Sep. 3, 2013 and published Mar. 6, 2014 as U.S. Publication No. 2014/0067206; Ser. No. 14/001,272, filed Aug. 23, 2013, now U.S. Pat. No. 9,233,641; Ser. No. 13/970,868, filed Aug. 20, 2013 and published Feb. 20, 2014 as U.S. Publication No. 2014/0049646; Ser. No. 13/964,134, filed Aug. 12, 2013 and published Feb. 20, 2014 as U.S. Publication No. 2014/0052340; Ser. No. 13/942,758, filed Jul. 16, 2013 and published Jan. 23, 2014 as U.S. Publication No. 2014/0025240; Ser. No. 13/942,753, filed Jul. 16, 2013 and published Jan. 30, 2014 as U.S. Publication No. 2014/0028852; Ser. No. 13/927,680, filed Jun. 26, 2013 and published Jan. 2, 2014 as U.S. Publication No. 2014/005907; Ser. No. 13/916,051, filed Jun. 12, 2013, now U.S. Pat. No. 9,077,098; Ser. No. 13/894,870, filed May 15, 2013 and published Nov. 28, 2013 as U.S. Publication No. 2013/0314503; Ser. No. 13/887,724, filed May 6, 2013 and published Nov. 14, 2013 as U.S. Publication No. 2013/0298866; Ser. No. 13/852,190, filed Mar. 28, 2013 and published Aug. 29, 2013 as U.S. Publication No. 2013/0222593; Ser. No. 13/851,378, filed Mar. 27, 2013 and published Nov. 14, 2013 as U.S. Publication No. 2013/0300869; Ser. No. 13/848,796, filed Mar. 22, 2012 and published Oct. 24, 2013 as U.S. Publication No. 2013/0278769; Ser. No. 13/847,815, filed Mar. 20, 2013 and published Oct. 3, 2013 as U.S. Publication No. 2013/0258077; Ser. No. 13/800,697, filed Mar. 13, 2013 and published Oct. 3, 2013 as U.S. Publication No. 2013/0258077; Ser. No. 13/785,099, filed Mar. 5, 2013 and published Sep. 19, 2013 as U.S. Publication No. 2013/0242099; Ser. No. 13/779,881, filed Feb. 28, 2013, now U.S. Pat. No. 8,694,224; Ser. No. 13/774,317, filed Feb. 22, 2013 and published Aug. 29, 2013 as U.S. Publication No. 2013/0222592; Ser. No. 13/774,315, filed Feb. 22, 2013 and published Aug. 22, 2013 as U.S. Publication No. 2013/0215271; Ser. No. 13/681,963, filed Nov. 20, 2012 and published Jun. 6, 2013 as U.S. Publication No. 2013/0141578; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. 2013/0002873, and/or U.S. provisional applications, Ser. No. 61/993,736, filed May 15, 2014; Ser. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; and/or Ser. No. 61/830,377, filed Jun. 3, 2013; which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392;

6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012 and published Jan. 3, 2013 as U.S. Publication No. 2013/0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149, and/or U.S. Publication No. US-2006-0061008 and/or U.S. patent application Ser. No. 12/578,732, filed Oct. 14, 2009 and published Apr. 22, 2010 as U.S. Publication No. 2010/0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for determining potential collision with another vehicle by a vehicle equipped with a vision system, said method comprising:

capturing image data of an exterior environment ahead of the equipped vehicle via a camera disposed at the equipped vehicle and having a field of view at least forward of the equipped vehicle;

processing, via an image processor, image data captured by said camera;

determining, via image processing by said image processor of captured image data, the presence of a leading vehicle ahead of the equipped vehicle;

determining, via image processing by said image processor of captured image data, a time to collision to the leading vehicle;

determining, via image processing by said image processor of captured image data, when a brake light of the leading vehicle is illuminated;

responsive at least in part to the determined time to collision being below a threshold value of time and determination that the brake light of the leading vehicle is illuminated, determining at least one of (i) a degree of warning to a driver of the equipped vehicle and (ii) a braking level of the equipped vehicle to mitigate collision with the leading vehicle; and after determining at least one of (i) a degree of warning to a driver of the equipped vehicle and (ii) a braking level of the equipped vehicle to mitigate collision with the leading vehicle, and responsive at least in part to determination, via image processing by said image processor of captured image data, that the brake light of the leading vehicle ceases to be illuminated, at least one of (i) reducing the determined degree of warning to the driver of the vehicle and (ii) decreasing the determined braking level of the equipped vehicle.

2. The method of claim 1, comprising at least one of (i) providing a warning in accordance with the determined degree of warning and (ii) applying the brakes of the equipped vehicle in accordance with the determined braking level.

3. The method of claim 2, comprising, after at least one of (i) providing a warning in accordance with the determined degree of warning and (ii) applying the brakes of the equipped vehicle in accordance with the determined braking level, and responsive at least in part to determination that the brake light of the leading vehicle ceases to be illuminated, at least one of (i) reducing the degree of warning provided to the driver of the vehicle and (ii) decreasing the braking level applied to the brakes of the equipped vehicle.

4. The method of claim 1, wherein determination of the braking level of the equipped vehicle is at least in part responsive to determination of a relative speed of the leading vehicle relative to the equipped vehicle.

5. The method of claim 4, comprising employing a weighting factor to determine the braking level of the equipped vehicle.

6. The method of claim 5, wherein employing a weighting factor comprises employing a weighting factor that decreases the emphasis on the determined time to collision to the leading vehicle responsive to a determination that the leading vehicle's brake light has ceased to be illuminated.

7. The method of claim 1, comprising determining a distance to the leading vehicle responsive to image processing by said image processor of captured image data.

8. The method of claim 1, comprising determining the velocity and acceleration of the equipped vehicle via at least one sensor of the equipped vehicle.

9. A method for determining potential collision with another vehicle by a vehicle equipped with a vision system, said method comprising:

capturing image data of an exterior environment ahead of the equipped vehicle via a camera disposed at the equipped vehicle and having a field of view at least forward of the equipped vehicle;

processing, via an image processor, image data captured by said camera;

determining, via image processing by said image processor of captured image data, the presence of a leading vehicle ahead of the equipped vehicle;

determining, via image processing by said image processor of captured image data, a time to collision to the leading vehicle;

determining, via image processing by said image processor of captured image data, when a brake light of the leading vehicle is illuminated;

responsive at least in part to the determined time to collision being below a threshold value of time and determination that the brake light of the leading vehicle is illuminated, determining a braking level of the equipped vehicle to mitigate collision with the leading vehicle;

applying the brakes of the equipped vehicle in accordance with the determined braking level; and after applying the brakes of the equipped vehicle, and responsive at least in part to determination, via image processing by said image processor of captured image data, that the brake light of the leading vehicle ceases to be illuminated, decreasing the braking level applied to the brakes of the equipped vehicle.

10. The method of claim 9, comprising determining a degree of warning to a driver of the equipped vehicle based at least in part on the determined time to collision and determination that the brake light of the leading vehicle is illuminated.

11. The method of claim 10, comprising providing a warning in accordance with the determined degree of warning.

12. The method of claim 9, wherein determination of the braking level of the equipped vehicle is at least in part responsive to determination of a relative speed of the leading vehicle relative to the equipped vehicle.

13. The method of claim 12, comprising employing a weighting factor to determine the braking level of the equipped vehicle.

14. The method of claim 13, wherein employing a weighting factor comprises employing a weighting factor that decreases the emphasis on the determined time to collision to the leading vehicle responsive to a determination that the leading vehicle's brake light has ceased to be illuminated.

15. A method for determining potential collision with another vehicle by a vehicle equipped with a vision system, said method comprising:

capturing image data of an exterior environment ahead of the equipped vehicle via a camera disposed at the equipped vehicle and having a field of view at least forward of the equipped vehicle;

processing, via an image processor, image data captured by said camera;

determining, via image processing by said image processor of captured image data, the presence of a leading vehicle ahead of the equipped vehicle;

determining, via image processing by said image processor of captured image data, a time to collision to the leading vehicle;

determining, via image processing by said image processor of captured image data, when a brake light of the leading vehicle is illuminated;

responsive at least in part to the determined time to collision being below a threshold value of time and determination that the brake light of the leading vehicle is illuminated, determining a degree of warning to a driver of the equipped vehicle;

providing a warning in accordance with the determined degree of warning; and after providing the warning, and responsive at least in part to determination, via image processing by said image processor of captured image data, that the brake light of the leading vehicle ceases to be illuminated, reducing the degree of warning provided to the driver of the vehicle.

16. The method of claim 15, wherein determination of the degree of warning to the driver of the equipped vehicle is at least in part responsive to determination of a relative speed of the leading vehicle relative to the equipped vehicle.

17. The method of claim 16, comprising employing a weighting factor to determine the degree of warning to the driver of the equipped vehicle.

18. The method of claim 17, wherein employing a weighting factor comprises employing a weighting factor that decreases the emphasis on the determined time to collision to the leading vehicle responsive to a determination that the leading vehicle's brake light has ceased to be illuminated.

* * * * *